April 25, 1944.   H. M. KIRSCHBAUM   2,347,325
COMPOSITE SOUND RECORD AND REPRESENTATIVE GRAPH
AND MEANS FOR PRODUCING THE SAME
Filed Oct. 13, 1941
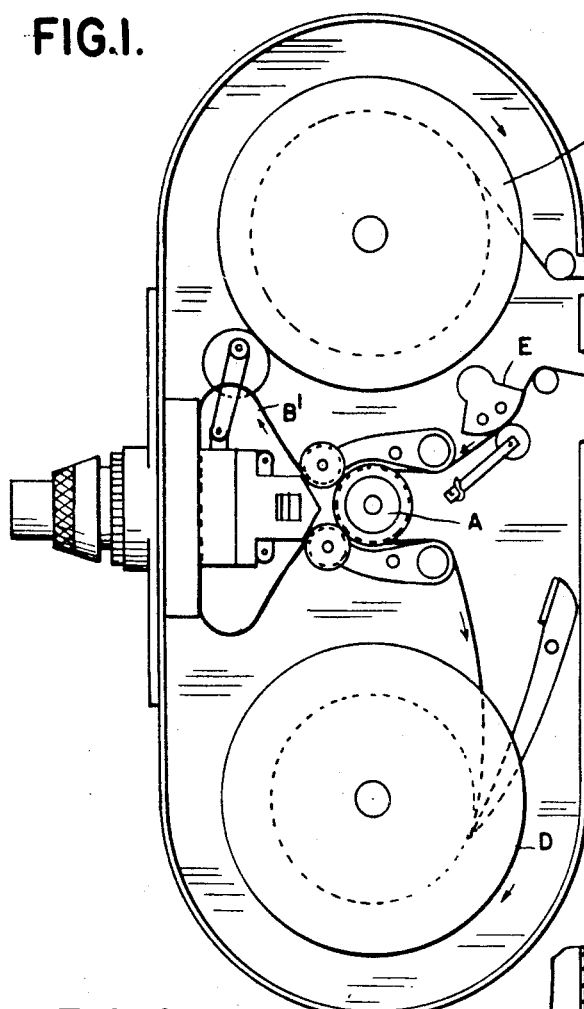
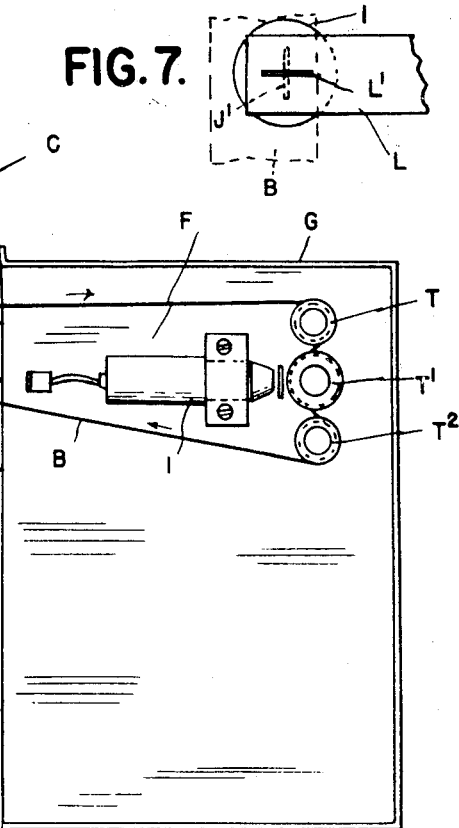
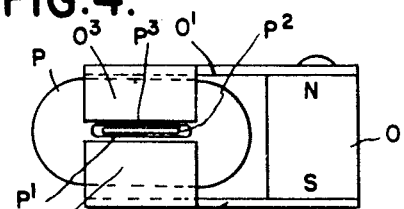
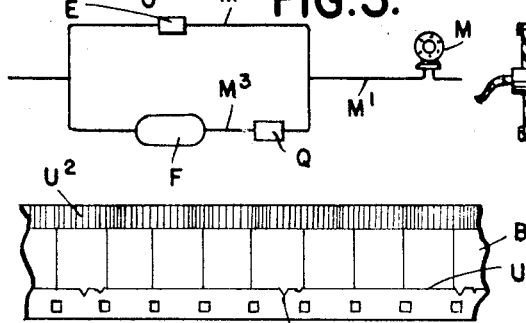
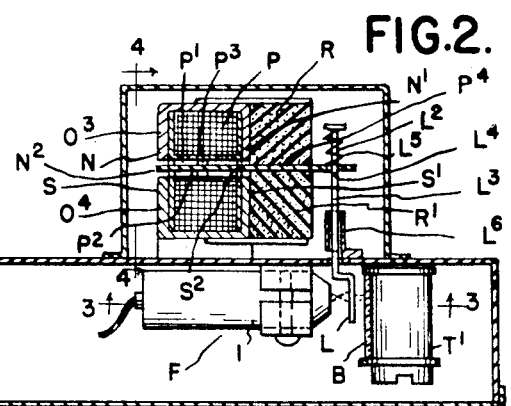
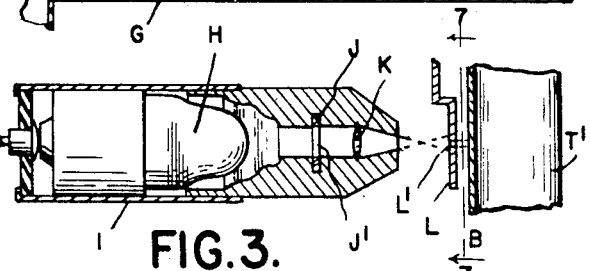
INVENTOR.
HARRY M. KIRSCHBAUM
BY Whittemore Hulbert + Belknap
ATTORNEYS Patented Apr. 25, 1944

2,347,325

UNITED STATES PATENT OFFICE 2,347,325

COMPOSITE SOUND RECORD AND REPRESENTATIVE GRAPH AND MEANS FOR PRODUCING THE SAME

Harry M. Kirschbaum, Detroit, Mich.

Application October 13, 1941, Serial No. 414,878

7 Claims. (Cl. 179—100.3)

The invention relates to means facilitating the analysis of sounds such, for instance, as those produced by the functioning of certain organs of the human body, to determine characteristics of their physical or physiological causes.

In particular, it is an object of the invention to facilitate analysis of the sound of the human heart by the simultaneous production of a sound record and representative graph thereof.

It is a further object to combine with this sound record and graph a moving picture record of the patient while undergoing examination. Such record is capable, when introduced into the proper apparatus, of simultaneously reproducing the sound and exhibiting the graph or the graph and motion picture.

With these objects in view, the invention consists in the construction of the record and the means for producing the same as hereinafter set forth.

In the drawing:

Fig. 1 is a side elevation of a motion picture camera to which my improved record-producing means is applied;

Fig. 2 is a cross section illustrating the graph-producing means;

Fig. 3 is a longitudinal section on line 3—3 of Fig. 2;

Fig. 4 is a section on line 4—4 of Fig. 2;

Fig. 5 is a diagram of the electric circuits;

Fig. 6 is an elevation of a short section of the record strip; and

Fig. 7 is an elevation view from the plane 7—7 of Fig. 3.

In the present state of the art, sound records for motion pictures are usually formed by light impinging on a marginal portion of the motion picture film and modified by microphonic control. Such records are usually unintelligible when viewed by the human eye and are only of service in reproducing the original sound. For assisting in the diagnosis of heart conditions, it is of value to have a record of the heart sound such as heard by the physician through a stethoscope, and it is of further value to have a graph of this sound which may be interpreted by the human eye. By the use of such a record, the physician may compare the reproduced sound with the graph and also compare both with the motion picture of the patient while under examination. The knowledge thus acquired may lead to the determination of all characteristics by the reading of the graph alone.

While I shall describe only the specific use of my invention in connection with heart examinations, it is obvious that it may be valuable in connection with other physiological examinations or the analysis of sounds produced by physical causes.

In Fig. 1, I have illustrated a motion picture camera of standard construction, to which is attached a sound-recording means and my improved graph-producing means. The camera has the usual roll A, driven at constant velocity by mechanism (not shown) for advancing the light-sensitive film or strip B from the reel C for the unexposed portion to the reel D for the exposed portion. There is also the usual loop B' in the strip, which is intermittently fed through the camera for successive picture exposures. As the construction of this camera is no part of my invention, it will be unnecessary to describe the same in further detail.

Adjacent to a portion of the strip advancing at constant velocity is a sound-recording device E. The sound-recording means is not a part of the present invention and may be of any suitable construction such as forming the subject matter of a copending application for Patent, Serial No. 409,579, filed September 4, 1941.

F is my improved graph-producing means, which is shown as located in an extension G of the camera case and is of the following construction:

H is a source of light such as an incandescent light bulb which is enclosed in a casing I and arranged to direct the light axially of this casing. J is an opaque diaphragm in the path of the light B and which is provided with a narrow slit J' for the passage of light therethrough. K is a lens which directs the light passing through the slit against a second opaque diaphragm L having a narrow slit L' therein, transverse to the direction of the slit J'. The diaphragm L is arranged adjacent to a portion of the film strip which moves at constant velocity and the slit L' extends transverse to the direction of movement of said strip while the slit J' is parallel to said direction of movement. Thus, the thin beam of light which passes through the slit J' and through the lens K will impinge upon the diaphragm L, but only the portion directed against the slit L' will pass the diaphragm and produce a spot of light on the sensitive film. As the film is constantly advancing, this light spot will trace a line, and if the diaphragm L is moved transversely to the direction of movement of the film, the line traced by the spot will be a curve.

With the construction as thus far described, it will be understood that a graph will be produced on a portion of the film strip by exposure to the spot of light passing through the slit L' and that the character of this graph will be determined by the character of movement imparted to the diaphragm L. This movement is effected by microphonically controlled motor means and preferably by a portion of the electric current controlled by the microphone for producing the sound record. However, it is not an object of my invention to produce a graph of the actual sound vibrations, but rather a graph which is representative of the sound. In other words, the characteristics of the sound heard by the human ear are represented, but not the vibrations which are the physical cause of the sound.

As diagrammatically represented in Fig. 5, the microphone M generates an undulatory electric current which, after being amplified by means not shown, passes through a circuit M', having the branch portions $M^2$ and $M^3$. The branch $M^2$ extends to the sound recorder E, while the branch $M^3$ extends to the graph-controlling means, which is of the following construction:

O is a permanent magnet having extended pole members O' and $O^2$ terminating in U-shaped portions $O^3$ and $O^4$ which are arranged opposite each other in fairly close proximity. Thus, as illustrated in Fig. 2, there are two spaced north poles N and N' which are opposite two spaced south poles S and S'. Within the U-shaped members $O^3$, $O^4$ is a helix P of fine insulated wire which is wound about a hollow non-magnetic core P'. Within this hollow core is arranged a magnetic core member $P^2$ which is energized by current flowing through the helix. The core $P^2$ is centrally pivotally supported at $P^3$ and extends on opposite sides thereof to have its end portions arranged respectively between the poles N, S and N', S' of the U-shaped members $O^3$, $O^4$. The helix P is included in the branch circuit $M^3$, but there is also included in this branch circuit a rectifier Q which permits only one phase of the alternating current to pass therethrough. Thus the core $P^2$ will be magnetized to varying intensities, but with its poles always at the same ends. The core is held in a normal position between the poles N, S, N', S' by resilient yieldable means, preferably sponge rubber cushions R, R'. These are arranged on opposite sides of and bear against an arm $P^4$ which forms an extension from one end of the core member $P^2$. When the core $P^2$ is magnetized by the passage of current through the helix, a north pole $N^2$ will be developed which will be repelled from the north pole N and attracted to the south pole S. At the same time, a south pole $S^2$ is developed at the opposite end of the core $P^2$, which will be repelled by the south pole S' and attracted by the north pole N'. This deflection is resisted by the resilient cushion R, which, when the magnetism in the core ceases, will return the core to its normal position. Also, the amount of deflection or angular movement of the core member $P^2$ is proportional to the strength of magnetism developed therein. The arm $P^4$ is pivotally connected to the diaphragm L through the medium of a vertically extending shank $L^2$ which has a reduced portion extending through an aperture in said arm and a shoulder portion $L^4$ engaging the under side of the arm. A spring $L^5$ holds the shoulder $L^4$ in contact with the arm $P^4$, but permits a relative rocking movement thereof. There is also a guide bearing $L^6$ for the shank $L^3$, which holds the diaphragm L in a fixed plane, but permits vertical oscillation thereof.

In the operation of the mechanism just described, variations in intensity of the magnetism developed in the core member $P^2$ and which correspond to one phase of the alternating current produced by the microphone will cause an oscillation of the core member $P^2$ and through it of the diaphragm L. This oscillation will move the spot of light transversely of the sensitive strip traveling adjacent thereto, with the result of forming a curved line U in the developed strip. This curve is on one side only of a base line and therefore produces a graph in which the base line is zero and the peaks of the curve U' are proportional to the intensity of sound. Due to initial resistance and also the cushioning of the members R and R', the graph will not be a record of the physical vibrations causing the sound, but will be representative of the variations actually detected by the human ear.

To hold the sensitive strip adjacent to the diaphragm L, a portion $B^2$ of this strip passes around idler rollers T, T', $T^2$, the roller T' being positioned close to the diaphragm. The diaphragm L is also normally positioned relative to the roller T', so that a marginal portion of the strip will be exposed to the light passing through the slits J', L', thereby forming a graph on this marginal portion at one side of the picture frames. A sound record $U^2$ is preferably formed on the opposite marginal portion of the strip, and the perforations in the strip for engaging the sprocket are preferably adjacent to the portion on which the graph is formed.

What I claim as my invention is:

1. Means for simultaneously recording sound and a representative visual graph thereof comprising microphonically controlled means for generating an undulatory electric current corresponding to the sound, means controlled by a split portion of said current for forming the sound record, and means controlled by another split portion of the current for forming the representative visual graph of the sound in such juxtaposition to said sound record as to be capable of substantially simultaneously reproducing the sound and displaying the graph.

2. Means for simultaneously recording sound and representative visual graph thereof comprising microphonically controlled means for generating an undulatory electric current corresponding to the sound, means controlled by a portion of said current for forming the sound record, means for rectifying another portion of said current, and means controlled by said rectified portion of the current for forming the visual graph said sound record and graph being in such juxtaposition as to be capable of substantial simultaneous reproduction and display.

3. Means for forming a visual graph representative of a sound record comprising microphonically controlled means for generating an undulatory electric current, means for rectifying said current, means operated by said rectified current for oscillating a light beam in correspondence with the general oscillations of the rectified phase of said undulatory current highly magnified, and means for advancing a sensitive strip transversely across the path of said oscillating beam.

4. Means for forming a graph representative of a sound, comprising a microphonically controlled means for generating an undulatory electric current, means for rectifying said current, an electromagnetic oscillating mechanism operated by said rectified current, a source of light, a diaphragm in the path of the light actuated by said oscillating mechanism and slitted transversely of the direction of oscillation for the passage of a thin beam of light therethrough, a second stationary diaphragm in the path of the light slitted parallel to the direction of oscillation, and means for advancing a light-sensitive strip across the path of that portion of the light beam passing through the slits of both diaphragms and in a direction transverse to the slit in the first-mentioned diaphragm.

5. Means for forming a visual graph representative of a sound record, comprising a microphonically controlled means for generating an undulatory electric current, means for rectifying said current, means operated by said rectified current for oscillating a light beam in correspondence with the general oscillations of the rectified phase of said undulatory current highly magnified, means for mechanically dampening out the lesser oscillations, and means for advancing a sensitive strip transversely across the path of said oscillating beam.

6. A composite record including a reproducible sound record and a record of the same sound modified to form a visually readable characteristic graph thereof in such juxtaposition as to be capable of simultaneously reproducing the sound and displaying the graph thereof.

7. A composite record including a reproducible sound record, a record of the same sound modified to form a visually readable characteristic graph thereof, and a motion picture of the sound producing means in such juxtaposition as to be capable of simultaneous reproduction.

HARRY M. KIRSCHBAUM.